United States Patent [19]

Ishii et al.

[11] Patent Number: 5,133,057
[45] Date of Patent: Jul. 21, 1992

[54] CO-PROCESSOR FOR CONTROL SETTING AN INTERNAL FLAG REGISTER OPERATION MODE WHICH CONTROLLED A MAIN PROCESSOR EXECUTION MODE IN A MULTI-PROCESSOR SYSTEM

[75] Inventors: Satoshi Ishii; Ikufumi Yamada, both of Tokyo, Japan

[73] Assignee: NEC Corporation, Tokyo, Japan

[21] Appl. No.: 356,243

[22] Filed: May 24, 1989

[30] Foreign Application Priority Data

May 25, 1988 [JP] Japan .................. 63-129260

[51] Int. Cl.⁵ .................. G06F 9/30; G06F 15/16
[52] U.S. Cl. .................. 395/375; 364/DIG. 1; 364/228.6; 364/230.6; 364/232.9; 364/267.91; 395/800
[58] Field of Search ... 364/200 MS File, 900 MS File

[56] References Cited

U.S. PATENT DOCUMENTS

| | | | |
|---|---|---|---|
| 4,312,066 | 1/1982 | Bantz et al. | 371/16 |
| 4,486,827 | 12/1984 | Shima et al. | 364/200 |
| 4,591,982 | 5/1986 | Buonomo et al. | 364/200 |
| 4,598,364 | 7/1986 | Gum et al. | 364/200 |
| 4,679,166 | 7/1987 | Berger et al. | 364/900 |
| 4,695,945 | 9/1987 | Irwin | 364/200 |
| 4,703,420 | 10/1987 | Irwin | 364/200 |
| 4,783,731 | 11/1988 | Miyazaki et al. | 364/200 |
| 4,833,596 | 5/1989 | Buckland et al. | 364/200 |
| 4,860,191 | 8/1989 | Nomura et al. | 364/200 |

Primary Examiner—Thomas C. Lee
Assistant Examiner—Krisna Lim
Attorney, Agent, or Firm—Foley & Lardner

[57] ABSTRACT

A multiprocessor system which includes a non-conventional co-processor to make it easier to observe the internal state of the co-processor. The system consists of a main processor, a co-processor, and a main memory unit connected by an external bus. The main processor sends instructions to the co-processor via an execution request line which connects the main and co-processors. The instruction sent via the request line, is either a debug mode-setting, register dumping, or an arithmetic execution instruction. The co-processor responds by setting a debug mode flag for a debug mode instruction, storing registers in the main memory unit for a register dumping instruction, or performing an arithmetic operation in response to an arithmetic instruction.

2 Claims, 3 Drawing Sheets

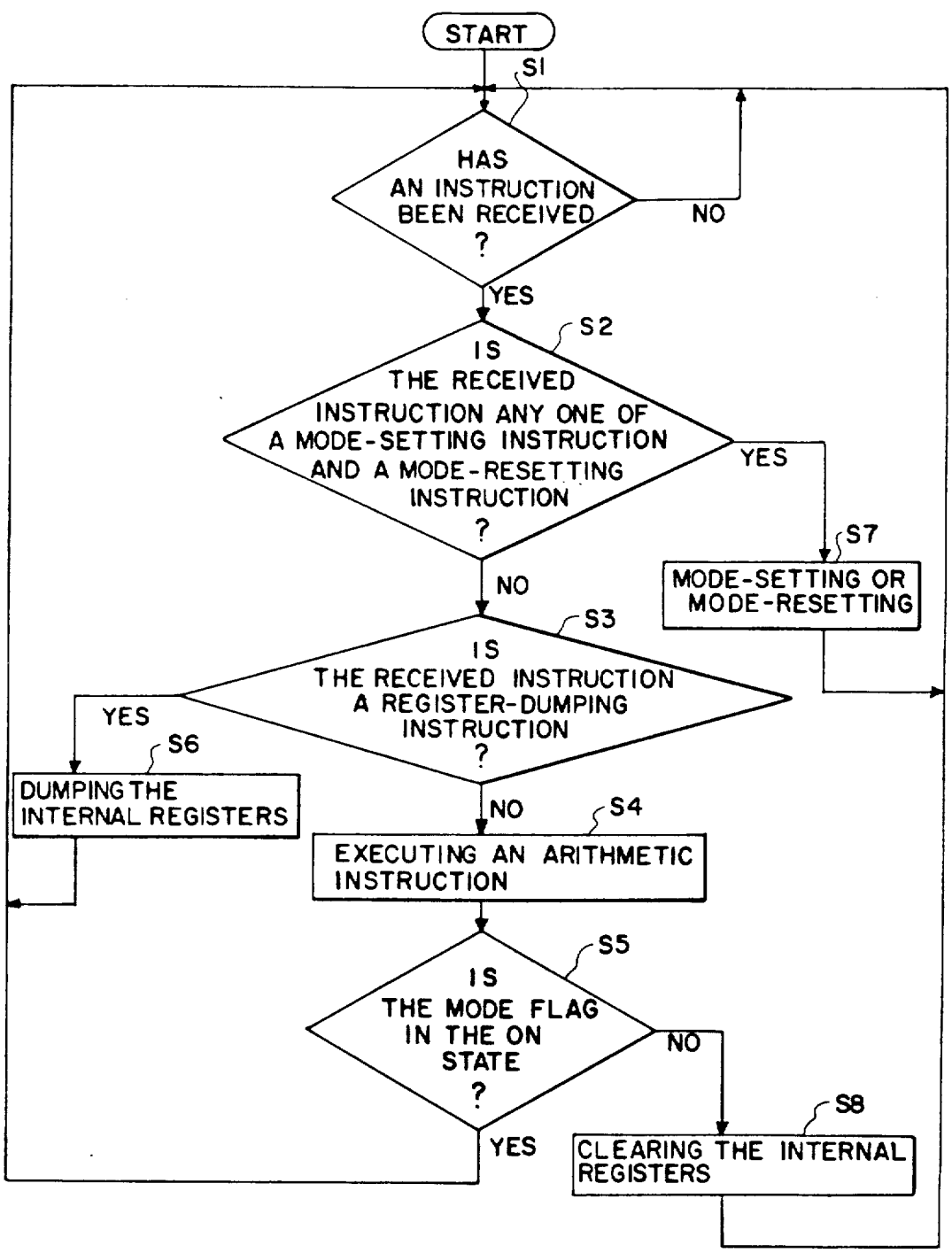

5,133,057

CO-PROCESSOR FOR CONTROL SETTING AN INTERNAL FLAG REGISTER OPERATION MODE WHICH CONTROLLED A MAIN PROCESSOR EXECUTION MODE IN A MULTI-PROCESSOR SYSTEM

BACKGROUND OF THE INVENTION

The invention relates to a multiprocessor system including a main processor and a co-processor.

In a conventional multiprocessor system including a main processor and a co-processor such as a processor is comprised of a plurality of electronic components, such as integrated circuits (IC's), mounted on a plurality of circuit boards, so that the internal state of the co-processor can be observed relatively easily. However, since IC-related technologies have progressed remarkably in recent years, a typical co-processor now is fabricated with one large scale integrated circuit (LSI), making it much more difficult to observe the internal state of the co-processor.

An object of the invention is, therefore, to provide a multiprocessor system free from the above-mentioned disadvantage of the current conventional co-processor.

SUMMARY OF THE INVENTION

According to an aspect of this invention, there is provided a multiprocessor system including a co-processor which executes operations instructed by a main processor by using one or more internal registers incorporated therein. The co-processor comprises: a mode display unit indicating one of a first mode and a second mode in response to one of a first request and a second request selectively given from the main processor; and an initialization control unit which does not initialize the one or more internal registers when the mode display unit indicates the first mode at the time of completion of each of the above-mentioned operations, and initializes the one or more internal registers when the mode display unit indicates the second mode at the time of completion of each of the above-mentioned operations.

BRIEF DESCRIPTION OF THE DRAWINGS

FIG. 3 is a flow chart for explaining an operation of the embodiment of the invention.

DETAILED DESCRIPTION OF THE PREFERRED EMBODIMENT OF THE INVENTION

In order to facilitate understanding of the invention, a description will be first provided concerning a conventional multi-processor system.

Figure 1:
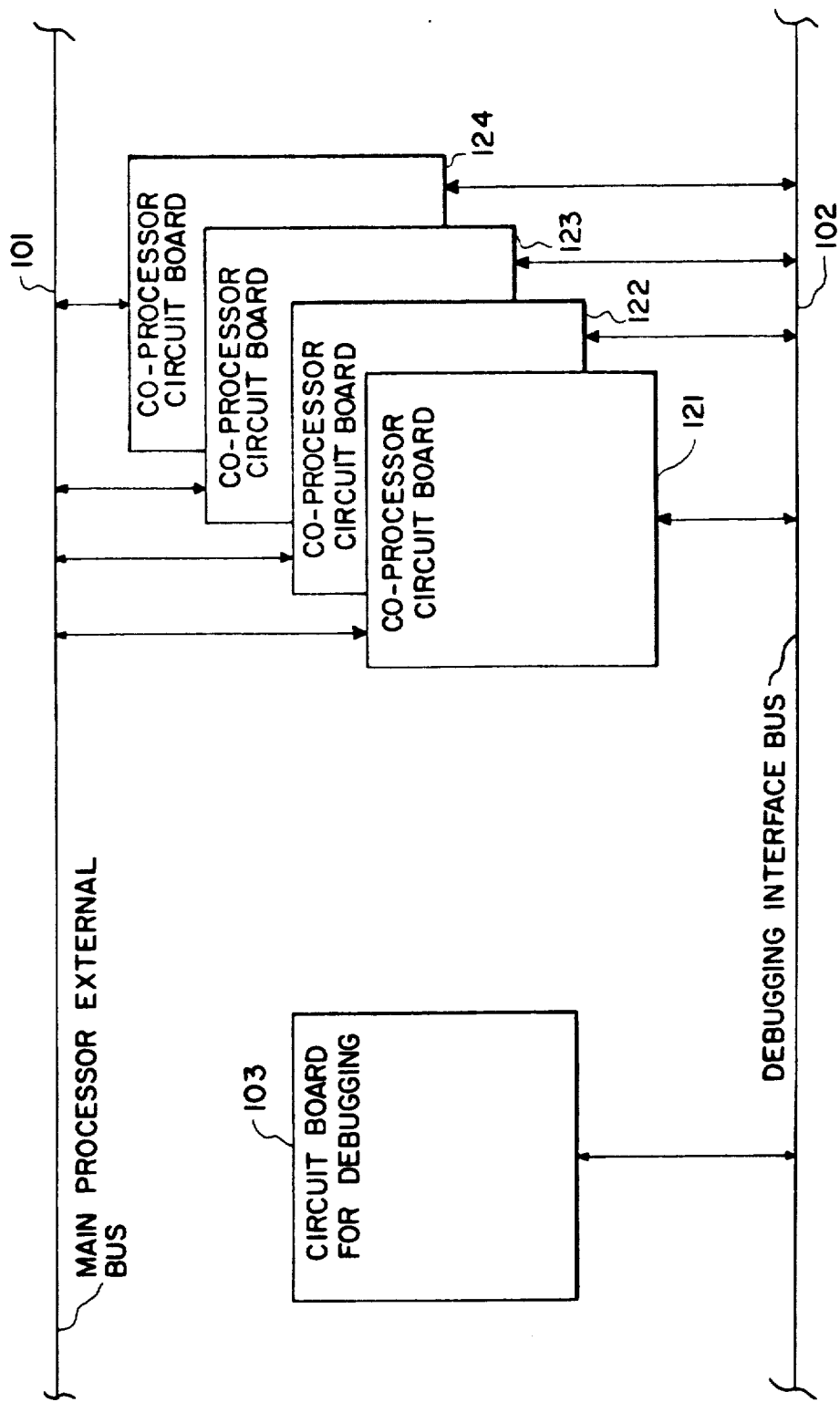
FIG. 1 is a block diagram of an example of conventional multiprocessor systems.

Referring now to FIG. 1, a conventional multiprocessor system comprises a main processor (not shown), four co-processor circuit boards 121 to 124 constituting one co-processor that operates in accordance with a microprogram, an external bus 101 connected to the main processor as well as the circuit boards 121 to 124, an interface bus for debugging 102 connected to the circuit boards 121 to 124, and a circuit board for debugging 103 connected to the bus 102. When an instruction is received from the main processor, under control of the microprogram the co-processor receives data from the main processor through the external bus 101, and then processes the data. Upon completion of the processing, the co-processor transfers its internal state information, that is, the contents of its various internal registers (which are located dispersively on the boards 121 to 124) to the circuit board 103 via the bus 102. In this manner, the internal state information of the co-processor is collected on the circuit board 103.

Description will now be made on an embodiment of the invention.

Figure 2:
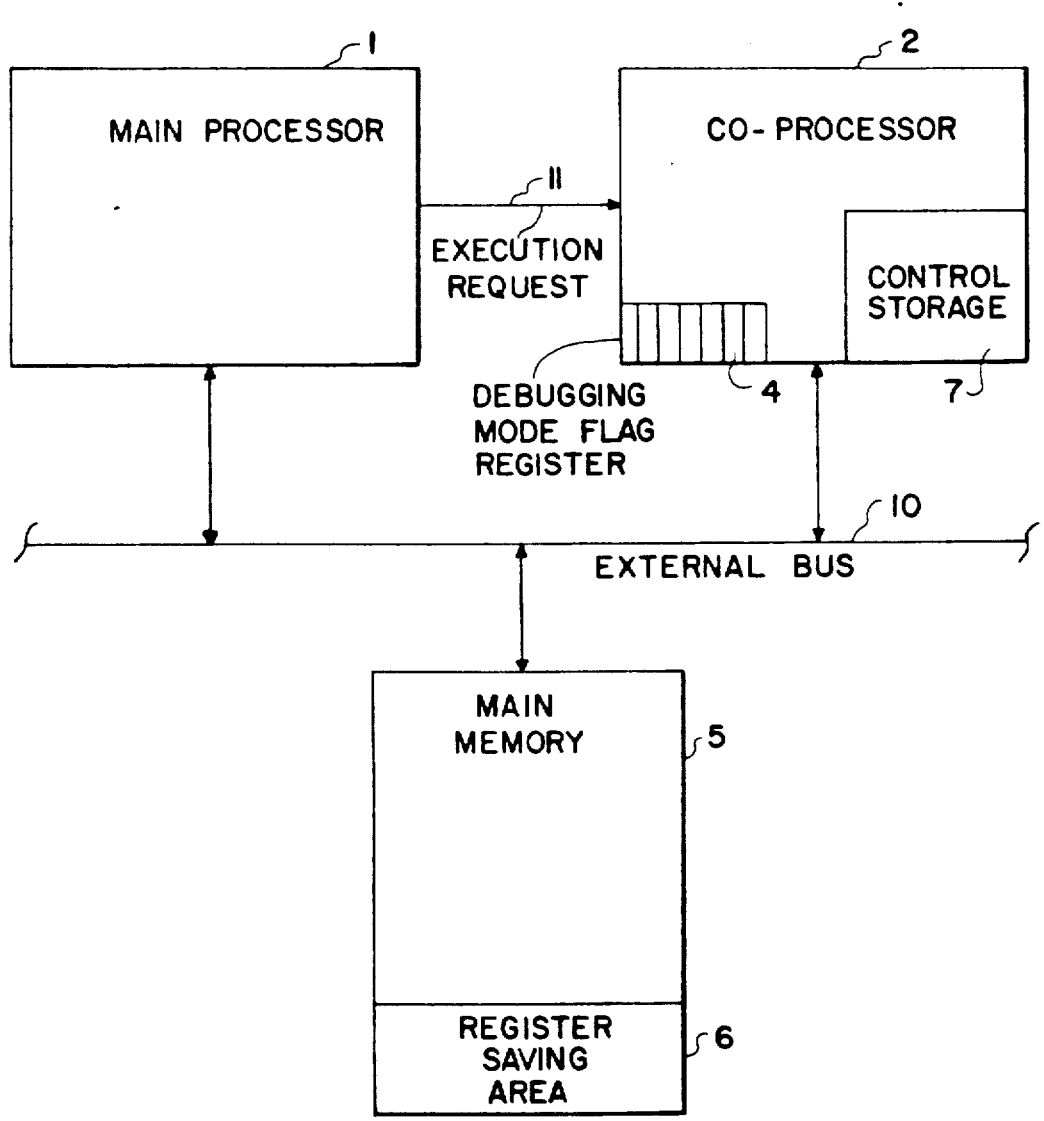
FIG. 2 is a block diagram of an embodiment of the invention.

Referring to FIG. 2, an embodiment of the invention comprises a main processor 1 such as a general-purpose microprocessor, a co-processor 2 which is internally provided with a debugging mode flag register 4 and whose operation is controlled by a microprogram stored in a control storage 7, a main memory 5 having a saving area 6 for saving the contents of internal registers of the co-processor 2, an external bus 10 connecting both of the processors 1 and 2 to the main memory 5, and an execution request line 11 transmitting instructions from the processor 1 to the co-processor 2.

The co-processor 2 performs operations in accordance with the operation flow shown in FIG. 3 under control of the microprogram. The operations will next be described in detail.

It is assumed that the processor 1 first issues a mode-setting instruction which is transmitted to the co-processor 2 via the line 11 (step S1).

The co-processor 2 first examines whether the instruction received from the line 11 is any one of a mode-setting instruction or a mode-resetting instruction (Step S2). Since the instruction received is for setting a debugging mode, a debugging mode flag stored in the debugging mode register 4 which is usually kept in an OFF state is turned into an ON state (Step S7). After turning the mode flag into the ON state, the processor 2 waits for a subsequent instruction (Step S1). Then, when the processor 2 receives an instruction for an arithmetic operation from the processor 1, the processor 2 checks to see whether or not the instruction received is any one of a mode-setting instruction or a mode-resetting instruction (Step S2). Since the instruction received is neither the mode-setting instruction nor the mode-resetting instruction, the processor 2 next examines whether the received instruction is a register-dumping instruction (Step S3). If not, the processor 2 performs an arithmetic operation specified by the received instruction (Step S4) because the received instruction is not a register-dumping instruction. After completion of the execution of the instruction, the processor 2 checks to see if the mode flag is in the ON state. If at (Step S5) this time, the mode flag is in the ON state, the processor 2 waits for the next instruction without initializing its internal registers. Then, when the processor 2 receives a register-dumping instruction from the processor 1, the processor 2 examines whether the instruction received is a register-dumping instruction after it executes the operation at Step S2. Since the received instruction is a register-dumping instruction, the processor 2 stores the contents of the internal registers into the saving area 6 of the main memory 5 (Step S6) and then waits for a subsequent instruction (Step S1). After completion of the execution of the register-dumping instruction, the processor 1 issues a mode-resetting instruction to the processor 2 which then performs the above-mentioned judgement operation at Step S2. Since the instruction issued is a mode-resetting instruction, the processor 2 turns the mode flag into the OFF state and then waits for the next instruction.

The debugging mode flag is usually kept in the OFF state, and the internal registers are usually initialized (Step S8) whenever an arithmetic operation specified by an arithmetic instruction given from the processor 1 is completed. Such initialization allows the processor 2 to start execution of the next instruction as soon as possible.

While this invention has thus far been described in conjunction with the preferred embodiment thereof, it will now readily be possible for those skilled in the art to put this invention into practice in various other ways.

What is claimed is:

1. In a multi-processor system which includes a co-processor which executes operations instructed by a main processor using one or more internal registers incorporated in said co-processor, said co-processor comprising:
    (a) mode display means indicating one of a first mode or a second mode in accordance with one of a first request or a second request selectively input from said main processor; and
    (b) initialization control means, operatively interconnected to said one or more internal registers and to said mode display means, which does not initialize said one or more internal registers when said mode display means indicates said first mode at a time of completion of each of said operations, and initializes said one or more internal registers when said mode display means indicates said second mode at a time of completion of each of said operations.

2. A process performed by a multiprocessor system comprising the following steps:
    (a) checking a request line between a main processor and a co-processor to determine whether a main processor instruction sent from said main processor to said co-processor is a mode-setting instruction or a mode-resetting instruction;
    (b) setting a debugging mode flag register in said co-processor if said main processor instruction is said mode-setting instruction or said mode-resetting instruction;
    (c) determining if said main processor instruction is a register dumping instruction if said main processor instruction is not said mode-setting instruction or said mode-resetting instruction;
    (d) storing contents of internal registers in said co-processor in a saving area of a main memory if said main processor instruction is a register dumping instruction; and
    (e) executing said main processor instruction as an arithmetic instruction and clearing said internal registers if a debugging flag is in an OFF state if said main processor instruction is neither said register dumping instruction, nor said mode-setting instruction or said mode-resetting instruction.

* * * * *